US012692916B2

(12) United States Patent
     Koduri

(10) Patent No.:    US 12,692,916 B2
(45) Date of Patent:      Jul. 28, 2026

(54) BRAKE ASSEMBLY WITH BEARING RETAINER

(71) Applicant: HL MANDO CORPORATION, Gyeonggi-do (KR)

(72) Inventor: Suresh Koduri, Novi, MI (US)

(73) Assignee: HL MANDO CORPORATION, Gyeonggi-do (KR)

( * ) Notice: Subject to any disclaimer, the term of this patent is extended or adjusted under 35 U.S.C. 154(b) by 507 days.

(21) Appl. No.: 18/207,677

(22) Filed: Jun. 9, 2023

(65) Prior Publication Data

US 2024/0410433 A1      Dec. 12, 2024

(51) Int. Cl.
     *F16D 65/00*       (2006.01)
     *F16C 33/38*       (2006.01)
     *F16D 65/18*       (2006.01)
     *F16D 121/24*      (2012.01)
     *F16D 125/40*      (2012.01)
(52) U.S. Cl.
     CPC ........ F16D 65/005 (2013.01); F16C 33/3887 (2013.01); F16D 65/18 (2013.01); *F16D 2121/24* (2013.01); *F16D 2125/40* (2013.01)
(58) Field of Classification Search
     CPC .... F16C 33/3887; F16C 35/06; F16D 65/005; F16D 65/02; F16D 65/18; F16D 2121/24; F16D 2125/36; F16D 2125/40
     USPC ........................................................ 188/72.8
     See application file for complete search history.

(56) References Cited

U.S. PATENT DOCUMENTS 4,784,438 A * 11/1988 Fikse ...................... F16C 35/06
                                                        175/371
2021/0277940 A1* 9/2021 Dobashi ................ F16C 35/073

FOREIGN PATENT DOCUMENTS

| DE | 1095064 B | * | 12/1960 | ............. F16D 1/093 |
| DE | 102005032529 A1 | * | 1/2007 | ............. F16D 1/094 |
| DE | 102006028200 A1 | * | 12/2007 | ............. F16C 19/28 |
| DE | 102009005109 A1 | * | 7/2010 | ............. F16D 1/097 |
| DE | 102015212183 A1 | * | 12/2016 | ........... F16C 35/077 |
| JP | S62196423 A | * | 8/1987 | |

(Continued)

OTHER PUBLICATIONS

English machined trnslation of JP-2005247306-A, Sep. 15, 2005.*

(Continued)

*Primary Examiner* — Robert A. Siconolfi
*Assistant Examiner* — San M Aung
(74) *Attorney, Agent, or Firm* — WOMBLE BOND DICKINSON (US) LLP

(57)                    ABSTRACT

A brake assembly may comprise: a rotatable part configured to be rotatable by an actuator; a translatable part operably coupled with the rotatable part and configured to be axially translatable relative to the rotatable part to move a brake pad according to rotation of the rotatable part; a bearing assembly comprising an inner race provided at the rotatable part, an outer race or ring, and rollable bodies rollably disposed between the inner race and the outer race or ring; and three or more bearing retainers disposed between the bearing assembly and a non-rotatable structure covering at least a part of the bearing assembly such that the bearing retainers disposed between the bearing assembly and the non-rotatable structure covering at least the part of the bearing assembly provide a force to the outer race or ring of the bearing assembly at least in one axial direction of the bearing assembly.

14 Claims, 7 Drawing Sheets

(56) References Cited

FOREIGN PATENT DOCUMENTS

| | | |
|----|----|----|
| JP | 5-86035 | 11/1993 |
| JP | 2001-082514 | 3/2001 |
| JP | 2005-133863 | 5/2005 |
| JP | 2005-186781 | 7/2005 |
| JP | 2005-247306 | 9/2005 |
| JP | 2005247306 A * | 9/2005 |
| JP | 2014-077503 | 5/2014 |
| JP | 2015-031388 | 2/2015 |
| JP | 2017-223268 | 12/2017 |
| JP | 2019-060476 | 4/2019 |
| JP | 2021-55670 | 4/2021 |
| KR | 10-2020-0029465 | 3/2020 |
| KR | 10-2021-0043581 | 4/2021 |

OTHER PUBLICATIONS

Office Action dated Jun. 10, 2025 for Korean Patent Application No. 10-2023-0175779 and its English translation provided by Applicant's foreign counsel.

* cited by examiner

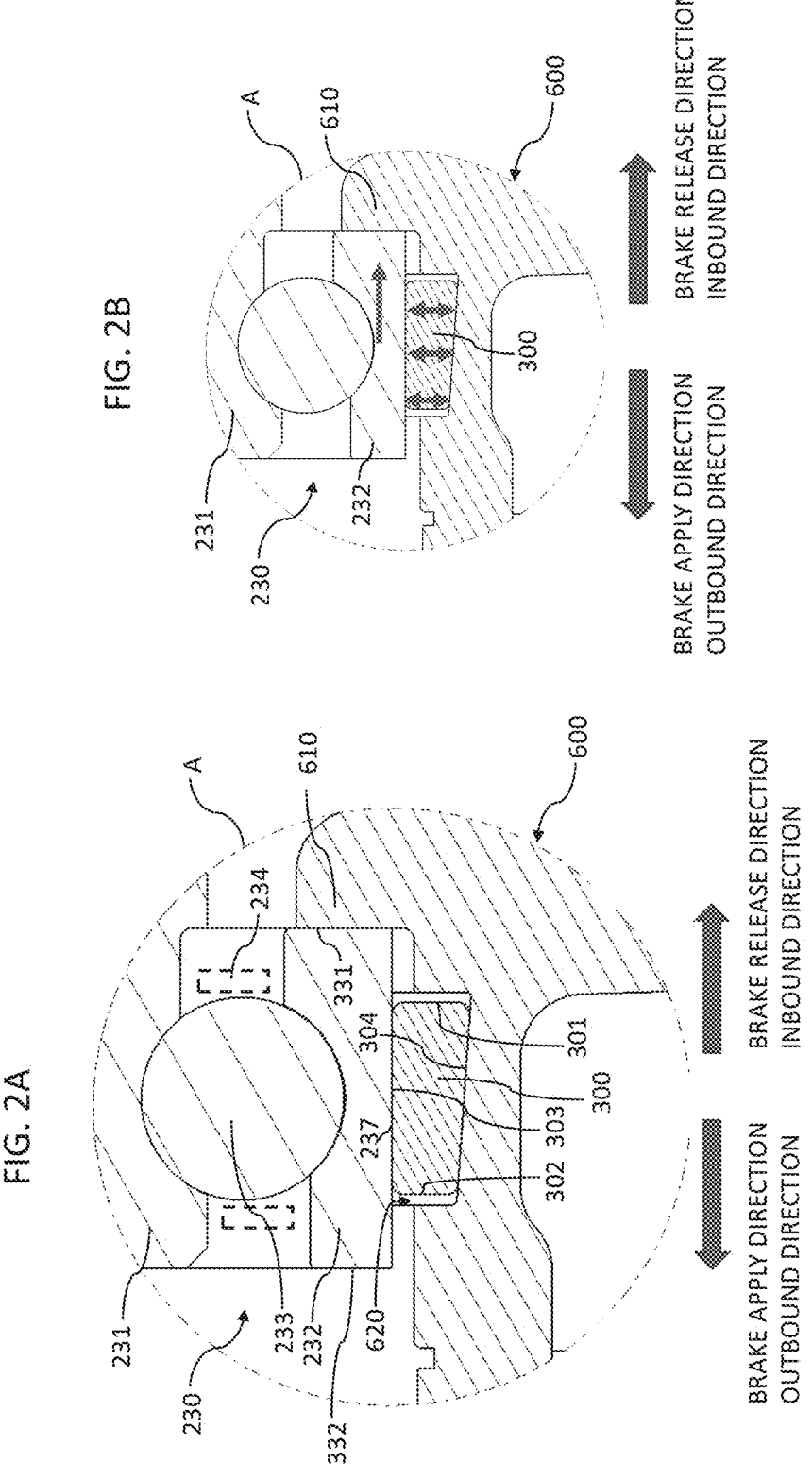

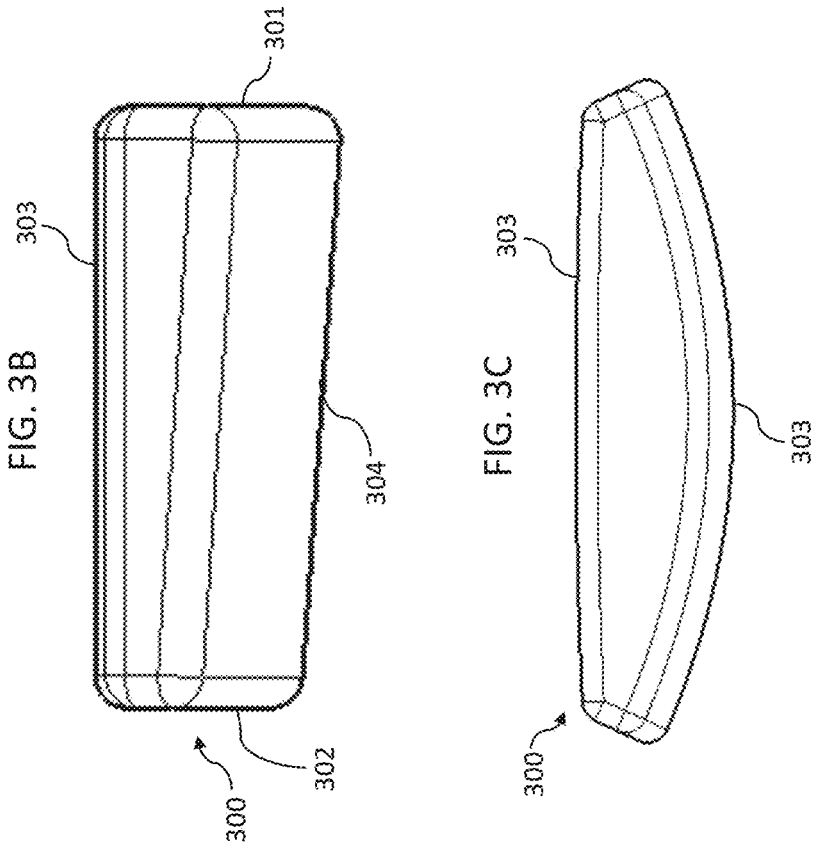
FIG. 3B
FIG. 3C
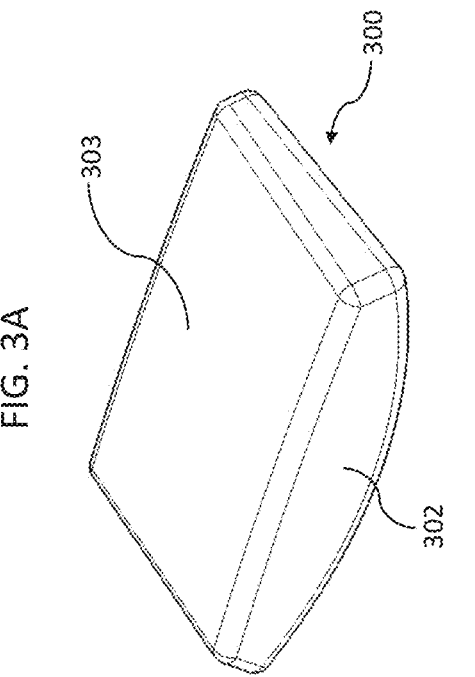
FIG. 3A

BRAKE ASSEMBLY WITH BEARING RETAINER

BACKGROUND

Various embodiments of the present disclosure generally relate to brake assemblies for a vehicle and more particularly to a brake assembly having a bearing assembly with bearing retainers for supporting the bearing assembly within a non-rotatable structure of the brake assembly.

An electro-mechanical brake (EMB) is a brake assembly that is actuated by electrical energy. For example, the EMB system generally provides braking of a vehicle by the use of a motor which becomes selectively energized in response to a signal of an electronic control unit (ECU) or a sensed depression of a brake input means. Generally, the EMB system may include a rotor, a brake caliper, and brake pads on opposing sides of the rotor. The brake caliper is slidably supported on pins secured to an anchor bracket fixed to a non-rotatable component of the vehicle, and includes one or more piston bores, each of which houses a piston that is movable along a piston axis during a brake apply and release of the brake apply. The brake pads are connected to one or more electrically actuated pistons for movement between a non-braking position and a braking position where the brake pads are moved into frictional engagement with the opposed braking surfaces of the rotor. For example, when an operator of the vehicle depresses a brake pedal, an actuator can move the piston into contact with one brake pad and then move one brake pad into contact with one side of the rotor, while another opposing brake pad is moved into contact with an opposing side of the rotor.

By way of example and without limitation, such an EMB system provides the desired braking in a substantially shorter amount of time than that which is provided by a conventional hydraulic braking system and allows each of the individual wheels of a vehicle or other selectively movable assembly to be selectively controlled, thereby enhancing the effectiveness of many operating strategies such as an anti-skid or anti-lock braking strategy or a strategy which is commonly referred to as an integrated vehicular dynamic strategy.

It is with respect to these and other general considerations that the following embodiments have been described. Also, although relatively specific problems have been discussed, it should be understood that the embodiments should not be limited to solving the specific problems identified in the background.

SUMMARY

The features and advantages of the present disclosure will be more readily understood and apparent from the following detailed description, which should be read in conjunction with the accompanying drawings, and from the claims which are appended to the end of the detailed description.

According to some embodiments of the present disclosure, a brake assembly may comprise: a rotatable part configured to be rotatable by an actuator, a translatable part operably coupled with the rotatable part, the translatable part configured to be axially translatable relative to the rotatable part to move a brake pad according to rotation of the rotatable part; a bearing assembly comprising an inner race provided at the rotatable part, an outer race or ring, and rollable bodies rollably disposed between the inner race and the outer race or ring; and three or more bearing retainers disposed between the bearing assembly and a non-rotatable structure covering at least a part of the bearing assembly such that the bearing retainers disposed between the bearing assembly and the non-rotatable structure covering at least the part of the bearing assembly provide a force to the outer race or ring of the bearing assembly at least in one axial direction of the bearing assembly.

At least a part of one side of the outer race or ring of the bearing assembly may be in contact with the non-rotatable structure covering at least the part of the bearing assembly, and the bearing retainers disposed radially between the bearing assembly and the non-rotatable structure may be configured to apply the force to the outer race or ring of the bearing assembly toward a surface of the non-rotatable structure contacting at least the part of the one side of the outer ring of the bearing assembly.

At least one of the bearing retainers has a slanted or angled surface such that the force of the bearing retainers may be applied to the outer race or ring of the bearing assembly toward the one axial direction of the bearing assembly.

A first portion of the bearing retainers positioned closer to the brake pad than a second portion of the bearing retainers may be thicker than a second portion of the bearing retainers positioned farther from the brake pad than the first portion of the bearing retainers.

One side of the outer race or ring of the bearing assembly may contact the non-rotatable structure covering at least the part of the bearing assembly, and at least one bearing retainer of the bearing retainers may have a shape tapered from one end of the at least one bearing retainer disposed farther from a surface of the non-rotatable structure contacting the one side of the outer race or ring of the bearing assembly than an other end of the at least one bearing retainer to the other end of the at least one bearing retainer disposed closer to the surface of the non-rotatable structure contacting the one side of the outer race or ring of the bearing assembly than the one end of the at least one bearing retainer.

At least one of the bearing retainers disposed between the bearing assembly and the non-rotatable structure covering at least a part of the bearing assembly may be wedge-shaped.

At least one of the bearing retainers may have a substantially flat surface contacting the outer race or ring of the bearing assembly and a curved surface contacting the non-rotatable structure covering at least the part of the bearing assembly.

An outer surface of the outer race or ring of the bearing assembly may have three or more faces which are lower curved or flattened than neighboring normals of the outer surface of the outer race or ring of the bearing assembly so that each of the three or more retainers is placed on a respective one of the three or more faces formed on the outer surface of the outer race or ring of the bearing assembly.

An inner surface of the non-rotatable structure covering at least the part of the bearing assembly may have three or more recesses in which the three or more bearing retainers are disposed, respectively.

One of the bearing retainers may be positioned between a lower curved or flattened face formed on an outer surface of the outer race or ring of the bearing assembly and a recess formed on an inner surface of the non-rotatable structure covering at least the part of the bearing assembly.

One or more recesses formed on an inner surface of the non-rotatable structure covering at least the part of the bearing assembly may have a slanted or angled surface corresponding to a slanted or angled surface of at least one of the retainers.

One or more slots or notches may be formed on an outer surface of the outer race or ring of the bearing assembly.

One or more slots or notches may be formed on an edge of an outer surface of the outer ring of the bearing assembly.

One or more slots or notches may be formed on one side of the outer race or ring of the bearing assembly opposite to an other side of the outer race or ring of the bearing assembly contacting the non-rotatable structure covering at least the part of the bearing assembly.

The retainers may have textured surfaces to hold the bearing assembly in place.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which:

FIGS. 2A and 2B are enlarged views of a portion A in FIG. 1 according to an exemplary embodiment of the present disclosure.

FIG. 3A is a front perspective view of a bearing retainer according to an embodiment of the present disclosure.

FIG. 3B is a side view of a bearing retainer according to an embodiment of the present disclosure.

FIG. 3C is a rear view of a bearing retainer according to an embodiment of the present disclosure.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
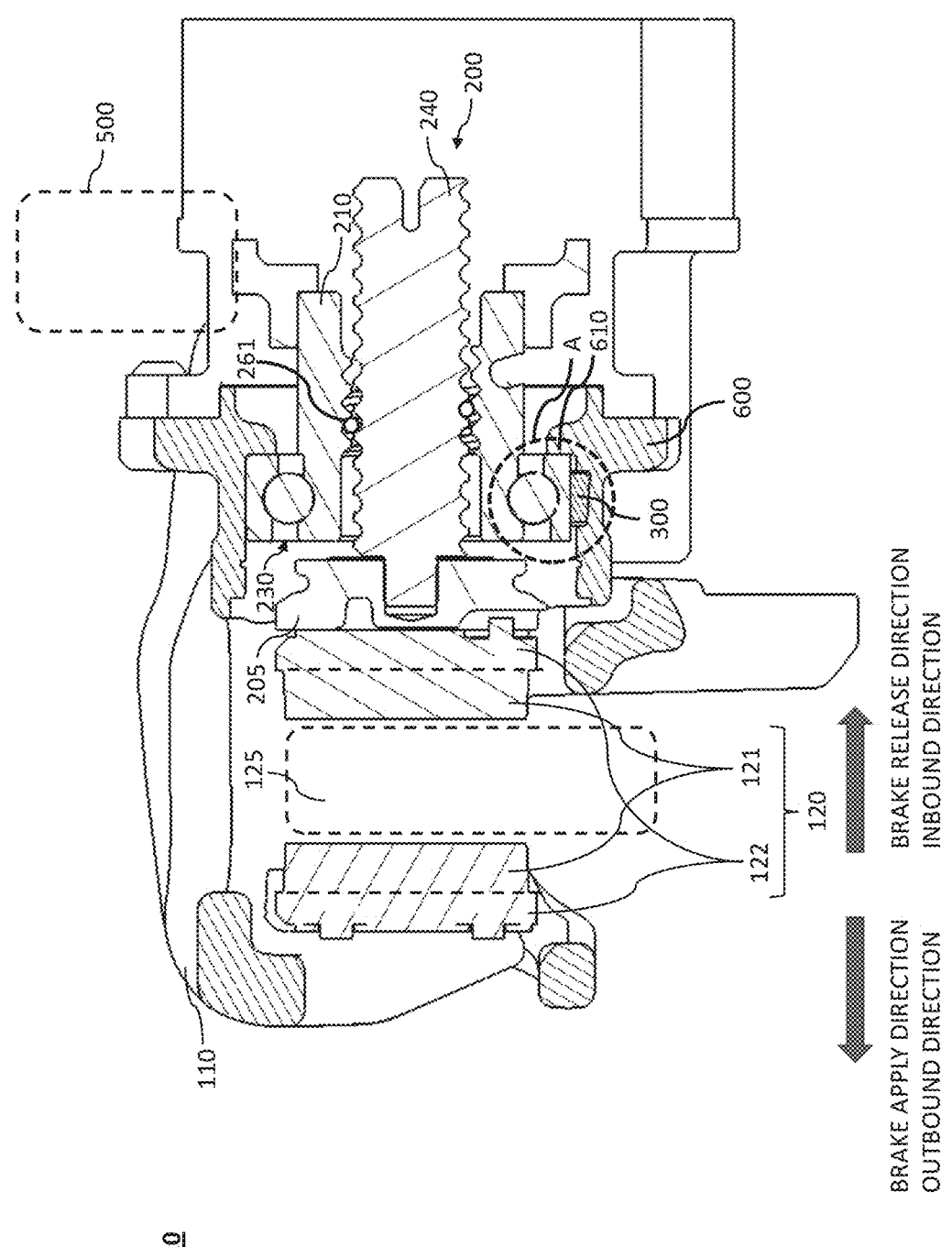
FIG. 1 is a cross-sectional view of a brake assembly according to an exemplary embodiment of the present disclosure.

FIG. 1 is a cross-sectional view of a brake assembly according to an exemplary embodiment of the present disclosure.

Referring to FIG. 1, a brake assembly 10 may include a brake caliper 110. The brake caliper 110 may be mounted in a floating manner by means of a brake carrier. The brake caliper 110 may be connected to any non-rotating or non-moving part of a vehicle. When the vehicle is in motion, a brake rotor 125 may rotate with a wheel about an axle of the vehicle. A brake pad assembly (or brake lining assembly) 120 is provided in the brake caliper 110, and includes a brake pad or lining 121 and a brake pad (or lining) carrier 122. The brake caliper 110 may include a bridge with fingers, and the fingers of the brake caliper 110 may be in contact with the brake pad carrier 122. The brake pad 121 is disposed with a small air clearance on a side of the brake rotor 125, such as a brake disc, in a release position so that no significant residual drag moment occurs. The brake pad carrier 122 is disposed between the brake pad 121 and a brake pad footing 205, the brake pad 121 and the brake pad carrier 122 of the brake assembly 120 move jointly together, and the movement of the brake pad carrier 122 causes the brake pad 121 to move with respect to the brake rotor 125.

The brake assembly 10 may comprise a screw mechanism 200 (e.g. a ball screw mechanism or a nut-screw mechanism) configured to convert rotary motion generated by an actuator assembly 500 into linear motion in order to move the brake pad assembly 120 toward or away from the brake rotor 125 in an axial direction.

The screw mechanism 200 may include a rotatable part 210 and a translatable part 240. For example, the rotatable part 210 may comprise a nut or a ball nut and the translatable part 240 may comprise a screw or a ball screw, although not required. The screw mechanism 200 may be contained within a housing 600. The rotatable part 210 and the translatable part 240 may be concentrically mounted in a cavity formed by an inner wall of the housing 600. The housing 600 may be fixedly coupled with the brake caliper 110.

The rotatable part 210 is operably coupled to the actuator assembly 500, and is configured to be rotatable by actuation of the actuator assembly 500. For example, the rotatable part 210 is directly or indirectly coupled to the actuator assembly 500 through one or more gears and/or belts, any other connecting means and combination thereof. The actuator assembly 500 may comprise a motor fixedly mounted in the housing 600 or disposed outside the housing 600. Examples of the actuator assembly 500 and other parts of the brake assembly 10 are provided in U.S. patent application Ser. No. 17/575,628, entitled "BRAKE ASSEMBLY WITH TELE-SCOPIC MULTIPLE BALL SCREW MECHANISM", filed on Jan. 13, 2022, which is incorporated herein by reference in its entirety.

The actuator assembly 500 rotates the rotatable part 210 of the ball-screw mechanism 200, and then the screw mechanism 200 converts the rotary motion of the rotatable part 210 to the linear motion of the brake pad footing 205 to move the brake pad assembly 120 between its brake apply and release positions. For example, the actuation of the actuator 500 causes the rotatable part 210 to rotate, and the rotation of the rotatable part 210 causes the translatable part 240 to be linearly moved. Specifically, the rotatable part 210 can rotate relative to the housing 600, and the rotation of the rotatable part 210 relative to the housing 600 causes to the translatable part 240 advance or retract axially depending on a direction of rotation of the rotatable part 210. As the rotatable part 210 rotates in an expanding direction, the translatable part 240 linearly translates with respect to the rotatable part 210 and the housing 600 so that the translatable part 240 can translate out from the rotatable part 210 and the housing 600 towards the brake rotor 125. As the rotatable part 210 rotates in a collapsing direction, the translatable part 240 linearly translates with respect to the rotatable part 210 and the housing 600 so that the translatable part 240 can linearly move toward the rotatable part 210 and the housing 600 in a direction away from the brake rotor 125. The brake pad footing 205 is fixedly coupled to the translatable part 240 so that the brake pad footing 205 can be linearly movable together with the translatable part 240. When the screw mechanism 200 is in the expanded state, the brake pad footing 205 pushes the brake pad assembly 120 toward the brake rotor 125. When the ball-screw mechanism 200 is in the collapsed state, the brake pad footing 205 moves away from the brake rotor 125.

While the expanding or collapsing direction depends upon whether the nut or ball nut of the rotatable part 210 and the screw or ball screw of the translatable part 240 are left-handed or right-handed, a specific direction is not critical to some embodiments of the present disclosure, and most embodiments of the present disclosure can work with either.

The rotatable part 210 may have a tubular shape with axially open ends, and the translatable part 240 is received within an inside space of the rotatable part 210. The rotatable part 210 and the translatable part 240 are operably connected to each other such that while the rotatable part 210 rotates, the translatable part 240 is linearly movable relative to the rotatable part 210. In other words, the translatable part 240 is slidable with respect to the rotatable part 210, but the translatable part 240 cannot be rotatable relative to the rotatable part 210, and therefore as the rotatable part 210 rotates, the translatable part 240 is linearly moved. For example, the translatable part 240 has a structure configured to prevent the translatable part 240 from rotating relative to the rotatable part 210 while allowing the translatable part 240 to translate in the axial direction.

At least a part of the translatable part 240 is retained within the rotatable part 210. The rotatable part 210 has an internally-threaded track groove and the translatable part 240 has an externally-threaded track groove for a rollable body arrangement of rollable bodies 261 (e.g. balls). The rollable bodies 261 are disposed between the internally-threaded track groove of the rotatable part 210 and the externally-threaded track groove of the translatable part 240. Ball returns either internally or externally carry the rollable bodies 261 from the end of their path back to the beginning to complete their recirculating track. A return tube attached to or included in the rotatable part 210 can perform recirculation of the rollable bodies 261. The internally-threaded track groove of the rotatable part 210 and the externally-threaded track groove of the translatable part 240 form a series of ball tracks to provide a helical raceway for reception of a train of recirculating the rollable bodies 261. The rollable bodies 261 may be metal spheres which decrease friction and transfer loads between adjacent components. The rotatable part 210 is rotatably supported by the translatable part 240 via the rollable bodies 261 and a bearing assembly 230. However, in alternative embodiments of the present disclosure, the rotatable part 210 and the translatable part 240 can be directly engaged with each other without the rollable bodies 261.

The bearing assembly 230 is configured to rotatably support the screw mechanism 200 for rotation of the rotatable part 210 of the screw mechanism 200 relative to a non-rotating structure of the brake assembly 10, for example, but not limited to, the housing 600. And, the bearing assembly 230 is configured to transfer the axial load of clamp force to the housing 600 to react. The bearing assembly 230 may be positioned between the rotatable part 210 of the screw mechanism 200 and the non-rotating structure or housing 600. The non-rotating structure or housing 600 may cover at least a part of the bearing assembly 230 such that the bearing assembly 230 can be seated in the non-rotating structure or housing 600.

FIGS. 2A and 2B are enlarged views of a bearing assembly taken from a portion A in FIG. 1 according to an exemplary embodiment of the present disclosure.

The bearing assembly 230 may have an inner race 231, an outer race (or an outer ring) 232, a plurality of rollable bodies 233 (e.g., bearing balls), and a bearing cage 234. The bearing assembly 230 may include any number of rollable bodies 233, for example, more than four balls. The outer race 232 may be located concentrically about the inner race 231, with the rollable bodies 233 therebetween, in a plane generally perpendicular to a rotatable axis of the rotatable part 210 or the inner race 231 or a translatable axis of the translatable part 240. The inner race 231 is rotatable, but the outer race 232 is substantially non-rotatable.

The rollable bodies 233 is configured to aid in rotation of the inner race 231 included in the translatable part 240 relative to the outer race or ring 232. The rollable bodies 233 are disposed in an annular cavity defined by the inner race 231 and the outer race 232, between the inner race 231 and the outer race 232. The rollable bodies 233 are supported within the bearing cage 234 such that the rollable bodies 233 are appropriately circumferentially spaced and retained by the bearing cage 234. The bearing cage 234 is located between the inner race 231 and the outer race 232. In the exemplary embodiment of the present disclosure, the rollable bodies 233 may be spherical in shape, for example, but not limited to, balls.

The brake assembly 10 further comprises one or more bearing retainers 300. The bearing retainer 300 may be configured to retain or support the bearing assembly 230 in the non-rotatable structure 600 such as a housing of the brake assembly 10. The bearing retainer 300 is insertable into between the bearing assembly 230 and the non-rotatable housing 600 to prevent or counteract the outboard axial movement of the outer race or ring 232 of the bearing assembly 230 relative to the non-rotatable structure or housing 600. The bearing retainer 300 may be radially between the outer race or ring 232 of the bearing assembly 230 and the non-rotatable structure or housing 600, thereby holding the bearing assembly 230 with respect to the non-rotatable structure or housing 600. The bearing assembly 230 can be retained on the bearing retainer 300 and within the non-rotatable structure or housing 600.

The bearing retainers 300 may be substantially equally spaced apart from each other. The embodiment of the present disclosure includes three bearing retainers 300 which are positioned 120 degrees apart, although not required. Any number of the bearing retainers 300 (for instance, one, two, four or more bearing retainers 300) may be located between the bearing assembly 230 and the non-rotatable structure or housing 600.

The non-rotatable structure or housing 600 has an opening or inner space configured to receive and retain the bearing assembly 230 therein. The bearing assembly 230 is secured within the opening or inner space of the non-rotatable structure or housing 600 by the bearing retainers 300. The non-rotatable structure or housing 600 has a stop 610 supporting or engaging a first side surface 331 of the outer race or ring 232 of the bearing assembly 230 to prevent the movement of the outer race or ring 232 of the bearing assembly 230 toward the inward of the non-rotatable structure or housing 600 (e.g. a brake release direction). The stop 230 can form a surface supporting or contacting one side of the outer race or ring 232 of the bearing assembly 230 and/or a space for receiving the outer race or ring 232 of the bearing assembly 230. The stop 230 can be any surface or structure of the non-rotatable structure or housing 600 which can support or be in contact with one side of the outer race or ring 232 of the bearing assembly 230. For example, the stop 610 of the non-rotatable structure or housing 600 is in a shape of a step as illustrated in FIGS. 1 and 2A for installing or positioning the bearing assembly 230 in the non-rotatable structure or housing 600. Alternatively, the stop 610 can be any structure capable of supporting one side of the outer race or ring 232 of the bearing assembly 230, for instance, a plate spring or a washer inserted in a groove or a projection formed on an inside surface of the non-rotatable structure or housing 600.

The bearing retainer 300 is configured to force the outer race or ring 232 of the bearing assembly 230 against the stop 610 of the non-rotatable structure 600 (e.g. a housing) to retain the bearing assembly 230 in the non-rotatable structure 600. The bearing retainer 300 may counteract undesired axial movement of the bearing assembly 230 for the brake assembly 10 in the outboard direction of the vehicle or the brake apply direction. For instance, the bearing retainer 300 can prevent the bearing assembly 230 from translating away from the stop 610 of the non-rotatable structure or housing 600 by any force which may be encountered during the brake operation (for instance, axially moving in the brake apply direction).

As illustrated in FIG. 2B, the bearing retainer 300 can presses the outer race or ring 232 of the bearing assembly 230 in order to push the outer race or ring 232 of the bearing assembly 230 toward the stop 610 of the non-rotatable structure 600 (e.g. the brake release direction or the inboard direction of the vehicle) such that the outer race or ring 232 of the bearing assembly 230 can be firmly secured in position. The outer race or ring 232 of the bearing assembly 230 is urged into contact with the non-rotatable structure 600, for example, but not limited to, the stop 610 of the non-rotatable structure 600. Accordingly, the bearing retainer 300 can provide a force for axially pushing the outer race or ring 232 of the bearing assembly 230 toward the inward of the non-rotatable structure or housing 600 (for instance, the brake release direction), and counteracts the axial movement of the outer race or ring 232 of the bearing assembly 230 to prevent dislodging the bearing assembly 230 from the non-rotatable structure or housing 600.

In order the bearing retainer 300 to generate a force for pressing the outer race or ring 232 of the bearing assembly 230 in only one direction as shown in FIG. 2B, the bearing retainer 300 may be made of any material that is capable of being deformed and returning to the original shape or form after being compressed or bent. For example, the bearing retainer 300 may have resilient or elastic material, although it should be understood by those skilled in the art that the present disclosure is not limited to any particular material for the bearing retainer 300. The bearing retainer 300 may be molded and/or machined from any resilient or elastic material. The resilient or elastic material of the bearing retainer 300 may be, for instance, but not limited to, rubber (e g. Ethylene Propylene Diene Monomer (EPDM), Butadiene rubber (BR), Butyl rubber (IIR), and Ethylene propylene rubber (EPR), Nitrile rubber (NBR, HNBR, HSN, Buna-N), Polyacrylate rubber (ACM), Styrene-butadiene rubber (SBR), and Polysulfide rubber (PSR)), a polymeric material, Fluoroelastomer (FKM), Perfluoroelastomer (FFKM), Poly-chloroprene (CR), Polyisoprene (IR), Polytetrafluoroethyl-ene (PTFE), Sanifluor, Thermoplastic elastomer (TPE) sty-renics, and Thermoplastic polyurethane (TPU) polyether, polyester. Therefore, the restoring force of the bearing retainer 300 generated toward the stop 610 of the non-rotatable structure 600 (e.g. the brake release direction or the inboard direction of the vehicle) can secure the bearing assembly 230 in the non-rotatable structure or housing 600.

Further, the bearing retainer 300 may have a surface slanted or angled relative to the bearing assembly 230. For example, as illustrated in FIG. 2A, a second surface 304 of the bearing retainer 300 engaging the non-rotatable structure or housing 600 may be slanted with respect to a surface 237 of the outer race or ring 232 of the bearing assembly 230 so that the bearing retainer 300 can apply the elastic or resilient force to the outer race or ring 232 of the bearing assembly 230 in the inboard direction of the vehicle or the brake release direction. The second surface 304 of the bearing retainer 300 can be angled or slanted at any angle which can maintain the outer race or ring 232 of the bearing assembly 230 to be in contact with the non-rotatable structure or housing 600. And, one or more recesses 620 formed on the inner surface of the non-rotatable structure or housing 600 for receiving the bearing retainers 300, respectively, may have a surface angled to correspond to the slant of the second surface 304 of the bearing retainer 300. Alternatively, a first surface 303 of the bearing retainer 300 contacting the outer race or ring 232 of the bearing assembly 230 or the surface 237 of the outer race or ring 232 of the bearing assembly 230 may be slated or angled such that the bearing retainer 300 can press the outer race or ring 232 toward the stop 610 of the non-rotatable structure or housing 600 (e.g. the inboard direction of the vehicle or the brake release direction).

A first end portion 301 of the bearing retainer 300 facing the stop 610 of the non-rotatable structure or housing 600 may be thicker than a second end portion 302 of the bearing retainer 300 facing the brake pad assembly 120 to bias (e.g. push) the outer race or ring 232 of the bearing assembly 230 against the stop 610 of the non-rotatable structure or housing 600. The bearing retainer 300 may have a shape tapered from the first end portion 301, closer to the stop 610 of the non-rotatable structure or housing 600 than the second end portion 302, to the second end portion 302, farther from the stop 610 of the non-rotatable structure or housing 600 than the first end 301.

For instance, the bearing retainer 300 may have a gener-ally wedge-shaped body. One exemplary embodiment of the bearing retainer 300 is shown in FIGS. 3A to 3C. FIG. 3A is a front perspective view of a bearing retainer according to an embodiment of the present disclosure, FIG. 3B is a side view of a bearing retainer according to an embodiment of the present disclosure, and FIG. 3C is a rear view of a bearing retainer according to an embodiment of the present disclosure.

A first surface 303 of the bearing retainer 300 supporting the outer race or ring 232 of the bearing assembly 230 may be substantially flat to closely contact the surface 237 of the outer race or ring 232 of the bearing assembly 230. However, the first surface 303 of the bearing retainer 300 contacted with the outer race or ring 232 is not limited to have any particular shape. For example, the first surface 303 of the bearing retainer 300 contacted with the outer race or ring 232 can be shaped to corresponding to the shape of the surface 237 of the outer race or ring 232 of the bearing assembly 230. Alternatively, the first surface 303 of the bearing retainer 300 can have any shape which can generate the force of pushing the outer race or ring 232 of the bearing assembly 230 toward the stop 610 of the non-rotatable structure or housing 600.

A second surface 304 of the bearing retainer 300 at least partially contacting the non-rotatable structure or housing 600 may be curved or rounded in order to assist the rotation of the outer race or ring 232 of the bearing assembly 230 using slots or notches 239 during the installing of the bearing assembly 230 to the non-rotatable structure or housing 600. Therefore, a center portion of the bearing retainer 300 may be thicker than both side edges of the bearing retainer 300.

A whole or part of an outside surface of the bearing retainer 300 may be textured to securely engage the outer race or ring 232 of the bearing assembly 230 and the non-rotatable structure or housing 600 in order to prevent slip therebetween. Alternatively, the bearing retainer 300 may have a plain surface (i.e. a non-textured surface).

The outer surface of the outer race or ring 232 of the bearing assembly 230 may have one or more faces 238 which are lower curved or flattened than neighboring normals of the outer surface of the outer race or ring 232 of the bearing assembly 230 so that each of the bearing retainers 232 can be placed on a respective one of the faces 238 formed on the outer surface of the outer race or ring 232 of the bearing assembly 230. Accordingly, the lower curved or flattened faces 238 of the outer race or ring 232 of the bearing assembly 230 may be aligned with the bearing retainers 300, respectively. The lower curved or flattened faces of the outer race or ring 232 can provide a space for accommodating the bearing retainer 300 between the outer race or ring 232 and the non-rotatable structure or housing 600. The combination of the lower curved or flattened faces 238 of the outer race or ring 232 of the bearing assembly 230 and the bearing retainer 300 with a wedge angle can restrict the axial and rotational movement of the bearing assembly 230.

The inner surface of the non-rotatable structure or housing 600 may have one or more recesses 620 for locating the bearing retainers 300 therein. Each of the bearing retainers 300 can be arranged or received in a respective recess 620 on the non-rotatable structure or housing 600. And, at least a part of the bearing retainer 300 protrudes out of the recess 620 of the non-rotatable structure or housing 600 to engage the outer race or ring 232 of the bearing assembly 230. As shown FIGS. 6A to 6D, the recesses 620 may be in a shape of a rounded or curved groove or depression, although not required. The recesses 620 can have any shape that can receive at least a part of the bearing retainer 300 therein.

Figure 4B:
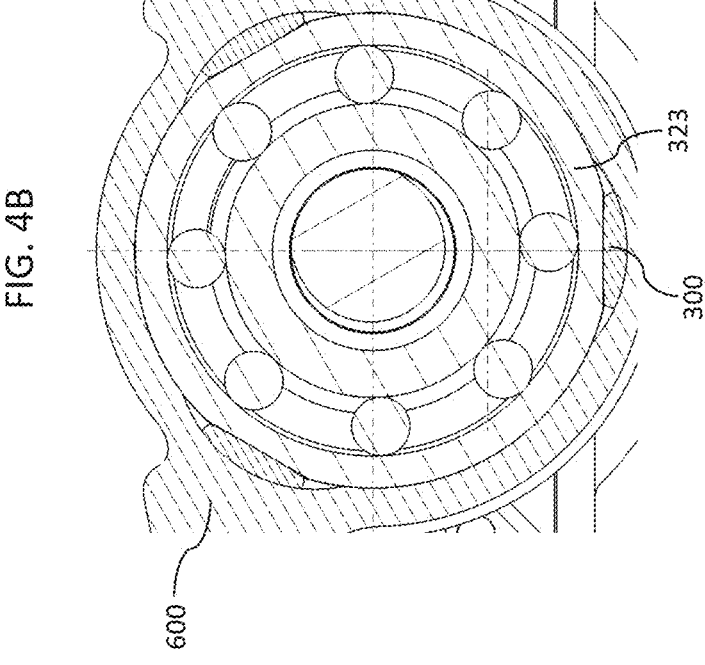
FIGS. 4A and 4B are partial cross-sectional views of a bearing assembly and a non-rotatable structure or housing according to an embodiment of the present disclosure.
Figure 4A:
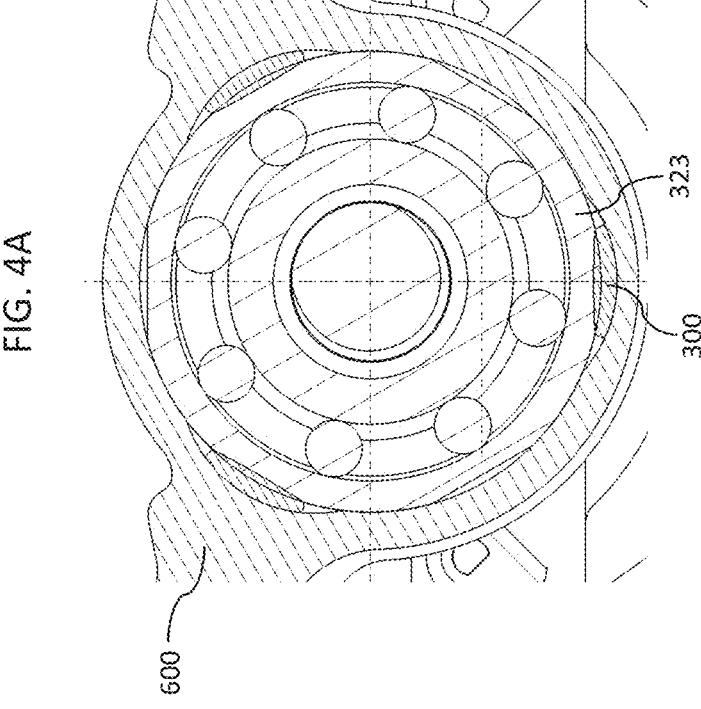
Figure 5A:
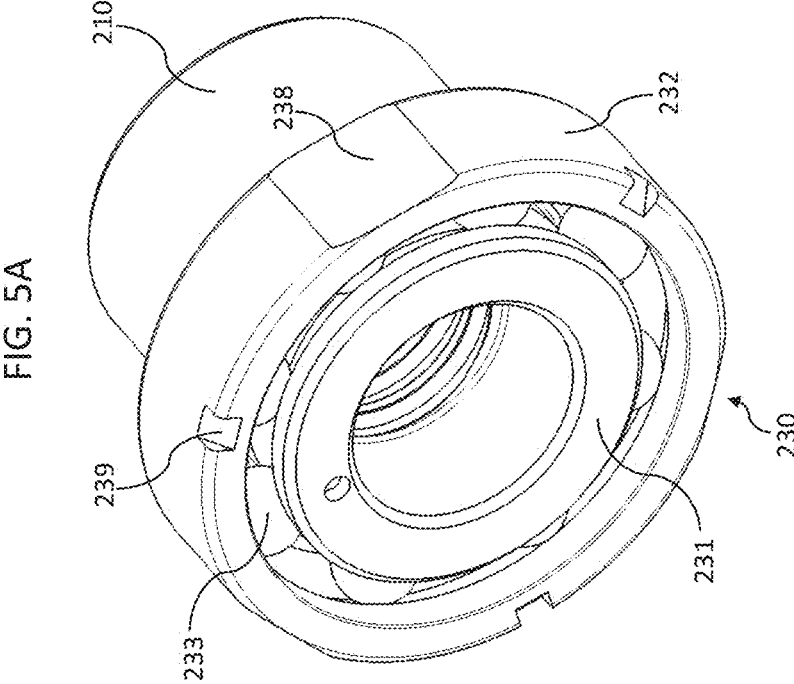
FIG. 5A is a perspective view of a bearing assembly and a rotatable part of a screw mechanism coupled together according to an embodiment of the present disclosure.
Figure 5B:
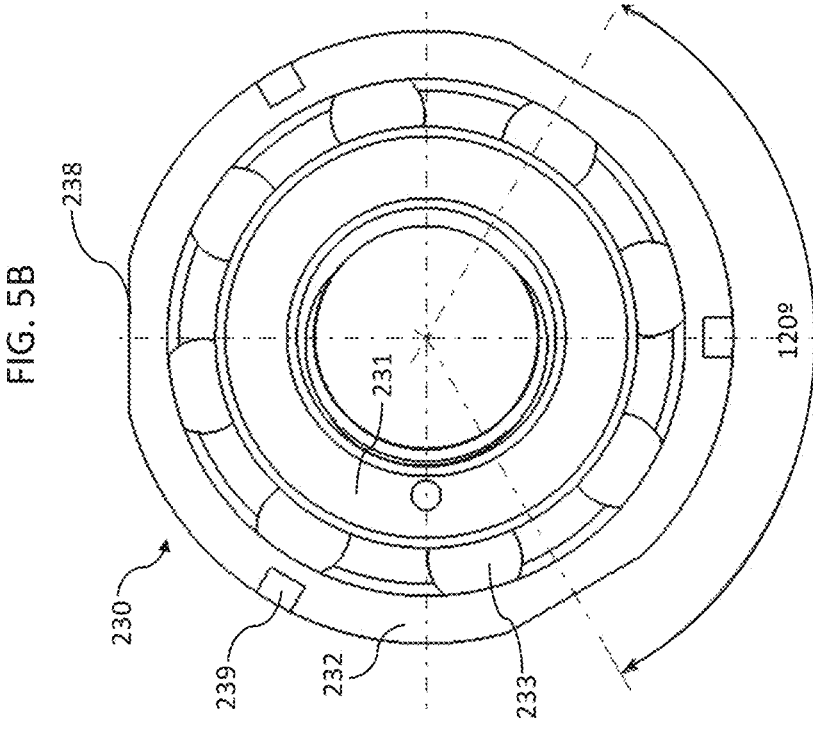
FIG. 5B is a front view of a bearing assembly and a rotatable part of a screw mechanism coupled together according to an embodiment of the present disclosure.
Figures 6A, 6B:
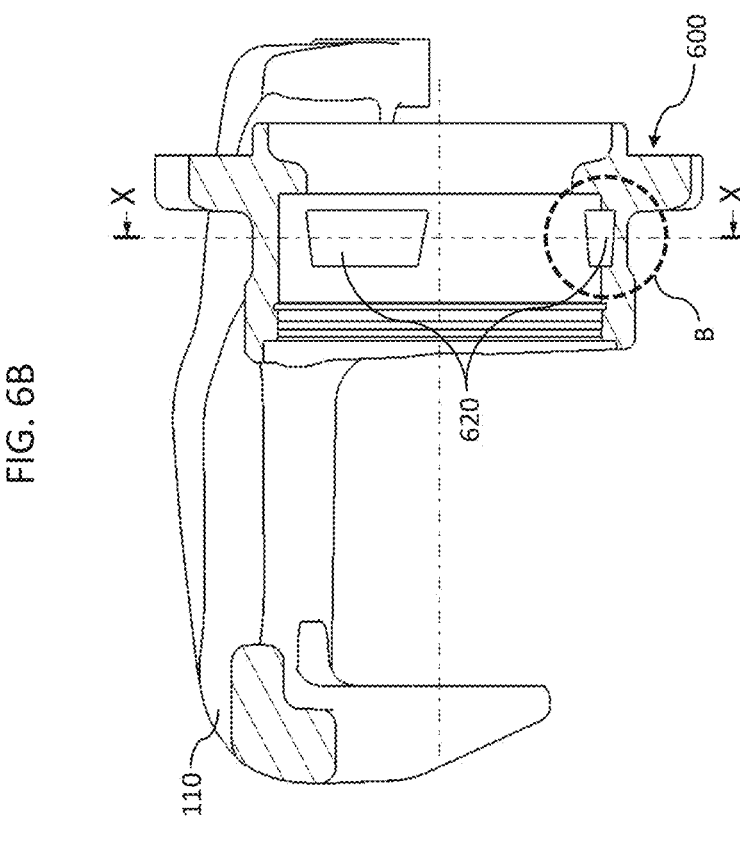
FIG. 6A is a perspective view of a non-rotatable structure or housing according to an embodiment of the present disclosure.
FIG. 6B is a cross-sectional view of a brake caliper and a non-rotatable structure or housing according to an embodiment of the present disclosure.
Figure 6D:
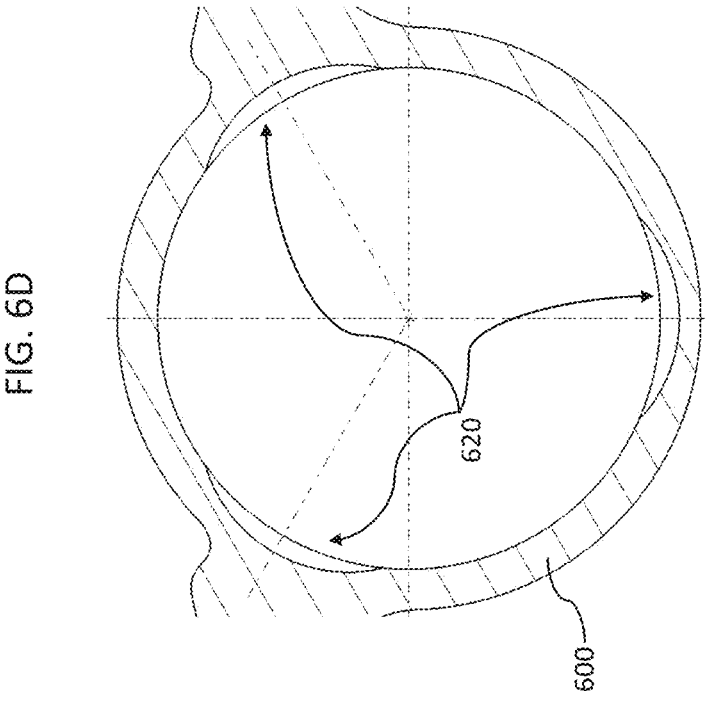
FIG. 6D shows a cross-sectional view cut along line X-X of FIG. 6B according to an embodiment of the present disclosure.
Figure 6C:
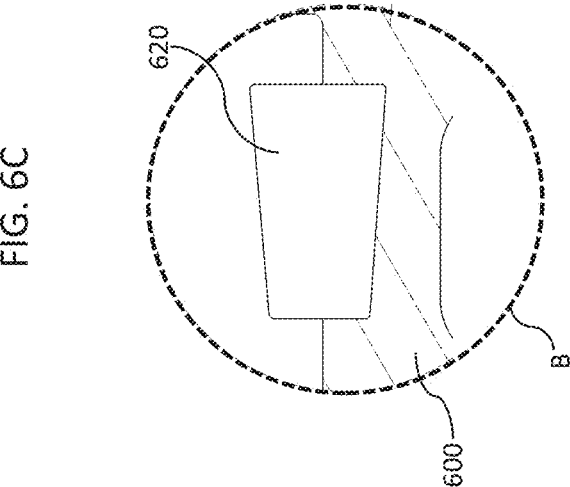
FIG. 6C is an enlarged view of a portion B in FIG. 6B according to an exemplary embodiment of the present disclosure.

One or more slots or notches 239 may be formed on an outer surface of the outer race or ring 232 of the bearing assembly 230. For example, the slots or notches 239 are located at an outer circumferential surface of the outer race or ring 232, or a side surface of the outer race or ring 232 facing the brake pad assembly 120 or the outside of the vehicle, or an edge between the outer circumferential surface and the side surface of the outer race or ring 232. However, the slots or notches 239 can be located at any positions into which a tool can be inserted to rotate the outer race or ring 232 during the installation of the bearing assembly 230 to the non-rotatable structure or housing 600. In order to assemble the bearing assembly 230 within the non-rotatable structure or housing 600, the bearing retainers 300 may be placed in the recesses 620 formed on the inside surface of the non-rotatable structure or housing 600, and then the bearing assembly 230 is inserted into the opening or inner space of the non-rotatable structure or housing 600. Once the bearing assembly 230 is fully seated in the non-rotatable structure or housing 600, the outer race or ring 232 of the bearing assembly 230 is rotated using the slots or notches 239, formed on the outer surface of the outer race or ring 232 of the bearing assembly 230, in order to squeeze the bearing retainers 300 until the lower curved or flattened faces 238 of the outer race or ring 232 are overlapped with the bearing retainers 300. For instance, the outer race or ring 232 is rotated from the position illustrated in FIG. 4A to the position shown in FIG. 4B using the slots or notches 239 on the outer surface of the outer race or ring 232 of the bearing assembly 230. During the installation of the bearing assembly 230 to the lower curved or flattened faces 238 of the outer race or ring 232 can be aligned over the bearing retainer 300, thus the bearing assembly 230 can be fully bottomed in the non-rotatable structure or housing 600 without interference.

According to some embodiments of the present disclosure, the bearing assembly 230 can be firmly secured in position by the bearing retainer 300, thereby resisting normal vibrations and other forces tending to dislodge the bearing assembly 230 from the housing 600. As a result, the bearing assembly 230 can be securely retained in the housing 600 by the bearing retainer 300. Further, according to certain embodiments of the present disclosure, by having the bearing assembly 230, the brake assembly 10 can have fewer components and it may be easier and less costly to assemble and manufacture the brake assembly 10, thereby reducing a packaging size and overall manufacturing cost of the brake assembly 10. Because the bearing retainer 300 which is radially between the bearing assembly 230 and the housing 600 can press the outer race or ring 232 of the bearing assembly 230 toward an axial inboard direction, no wave washer or snap ring axially located relative to the bearing assembly 230 for retaining the bearing assembly 230 within the housing 610 may not be required so that an axial packaging size can be reduced.

Although the example embodiments have been described in detail, it should be understood that various changes, substitutions and alterations can be made herein without departing from the spirit and scope of the present disclosure as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A brake assembly comprising:
a rotatable part configured to be rotatable by an actuator;
a translatable part operably coupled with the rotatable part, the translatable part configured to be axially translatable relative to the rotatable part to move a brake pad according to rotation of the rotatable part;
a bearing assembly comprising an inner race provided at the rotatable part, an outer race or ring, and rollable bodies rollably disposed between the inner race and the outer race or ring; and
three or more bearing retainers disposed between the bearing assembly and a non-rotatable structure covering at least a part of the bearing assembly such that the bearing retainers disposed between the bearing assembly and the non-rotatable structure covering at least the part of the bearing assembly provide a force to the outer race or ring of the bearing assembly at least in one axial direction of the bearing assembly,
wherein an inner surface of the non-rotatable structure covering at least the part of the bearing assembly has three or more recesses in which the three or more bearing retainers are disposed, respectively.

2. The brake assembly according to claim 1, wherein at least a part of one side of the outer race or ring of the bearing assembly is in contact with the non-rotatable structure covering at least the part of the bearing assembly, and the bearing retainers disposed radially between the bearing assembly and the non-rotatable structure are configured to apply the force to the outer race or ring of the bearing assembly toward a surface of the non-rotatable structure contacting at least the part of the one side of the outer ring of the bearing assembly.

3. The brake assembly according to claim 1, wherein at least one of the bearing retainers has a slanted or angled surface such that the force of the bearing retainers is applied to the outer race or ring of the bearing assembly toward the one axial direction of the bearing assembly.

4. The brake assembly according to claim 1, wherein a first portion of the bearing retainers positioned closer to the brake pad than a second portion of the bearing retainers is thicker than a second portion of the bearing retainers positioned farther from the brake pad than the first portion of the bearing retainers.

5. The brake assembly according to claim 1, wherein one side of the outer race or ring of the bearing assembly contacts the non-rotatable structure covering at least the part of the bearing assembly, and at least one bearing retainer of the bearing retainers has a shape tapered from one end of the at least one bearing retainer disposed farther from a surface of the non-rotatable structure contacting the one side of the outer race or ring of the bearing assembly than an other end of the at least one bearing retainer to the other end of the at least one bearing retainer disposed closer to the surface of the non-rotatable structure contacting the one side of the outer race or ring of the bearing assembly than the one end of the at least one bearing retainer.

6. The brake assembly according to claim 1, wherein at least one of the bearing retainers disposed between the bearing assembly and the non-rotatable structure covering at least a part of the bearing assembly is wedge-shaped.

7. The brake assembly according to claim 1, wherein at least one of the bearing retainers has a substantially flat surface contacting the outer race or ring of the bearing assembly and a curved surface contacting the non-rotatable structure covering at least the part of the bearing assembly.

8. The brake assembly according to claim 1, wherein an outer surface of the outer race or ring of the bearing assembly has three or more faces which are lower curved or flattened than neighboring normals of the outer surface of the outer race or ring of the bearing assembly so that each of the three or more retainers is placed on a respective one of the three or more faces formed on the outer surface of the outer race or ring of the bearing assembly.

9. The brake assembly according to claim 1, wherein one of the bearing retainers is positioned between a lower curved or flattened face formed on an outer surface of the outer race or ring of the bearing assembly and a recess formed on an inner surface of the non-rotatable structure covering at least the part of the bearing assembly.

10. The brake assembly according to claim 1, wherein one or more recesses formed on an inner surface of the non-rotatable structure covering at least the part of the bearing assembly has a slanted or angled surface corresponding to a slanted or angled surface of at least one of the retainers.

11. The brake assembly according to claim 1, wherein one or more slots or notches are formed on an outer surface of the outer race or ring of the bearing assembly.

12. The brake assembly according to claim 1, wherein one or more slots or notches are formed on an edge of an outer surface of the outer ring of the bearing assembly.

13. The brake assembly according to claim 1, wherein one or more slots or notches are formed on one side of the outer race or ring of the bearing assembly opposite to an other side of the outer race or ring of the bearing assembly contacting the non-rotatable structure covering at least the part of the bearing assembly.

14. The brake assembly according to claim 1, wherein the retainers have textured surfaces to hold the bearing assembly in place.

* * * * *